United States Patent [19]

Meyer et al.

[11] Patent Number: 5,091,687
[45] Date of Patent: Feb. 25, 1992

[54] APPARATUS FOR EXCHANGING AND CHARGING OF ENERGY STORAGES OF TRANSPORT VEHICLES

[75] Inventors: Urs Meyer, Niederglatt; Niklaus Gartenmann, Winterthur; Hanspeter Ulrich, Egg, all of Switzerland

[73] Assignee: Maschinenfabrik Rieter AG, Winterthur, Switzerland

[21] Appl. No.: 551,136

[22] Filed: Jul. 11, 1990

[30] Foreign Application Priority Data

Jul. 31, 1989 [CH] Switzerland ............... 02-833/89

[51] Int. Cl.⁵ .............................................. H22J 7/00
[52] U.S. Cl. .......................................... 320/2; 104/34
[58] Field of Search ........................ 320/2, 6, 8, 15;
104/34; 414/222, 223, 267, 391, 392, 399, 589, 592, 609, 662, 672, 749, 751

[56] References Cited

U.S. PATENT DOCUMENTS

| | | | |
|---|---|---|---|
| 4,299,526 | 11/1981 | Smith | 104/34 X |
| 4,413,219 | 1/1983 | Ducharme et al. | 320/2 X |
| 4,450,400 | 5/1984 | Gwyn | 320/2 |
| 4,795,358 | 1/1989 | Lyles | 320/2 X |
| 4,983,903 | 1/1991 | Bae et al. | 320/2 |

FOREIGN PATENT DOCUMENTS

| | | |
|---|---|---|
| 0218059 | 4/1987 | European Pat. Off. |
| 2114962 | 8/1972 | Fed. Rep. of Germany |
| 2444711 | 4/1976 | Fed. Rep. of Germany |
| 2535454 | 7/1976 | Fed. Rep. of Germany |
| 2410102 | 7/1977 | Fed. Rep. of Germany |
| 2270195 | 12/1975 | France |

Primary Examiner—Steven L. Stephan
Assistant Examiner—Kristine Peckman
Attorney, Agent, or Firm—Sandler, Greenblum & Bernstein

[57] ABSTRACT

The charging station includes a circular magazine which is pivotable about a central axis. Above or beneath the circular magazine, which forms a first disk-shaped partial region of the charging station, there is arranged a second partial region, and specifically a device carrier or support. The latter carries the charging and control devices. In the circular magazine there are a plurality of deposit positions or places for energy storage devices where discharged energy storage devices of transport vehicles are again recharged. A transport carriage with gripper devices serves to displace the energy storage devices from the transport vehicle into the circular magazine and is arranged at the region between the central axis and the periphery of the circular magazine. The exchange and charging apparatus is very compact and space-saving in construction and affords the direct and automatic transfer of energy storage devices between transport vehicles and the charging station.

17 Claims, 3 Drawing Sheets

APPARATUS FOR EXCHANGING AND CHARGING OF ENERGY STORAGES OF TRANSPORT VEHICLES

BACKGROUND OF THE INVENTION

The present invention broadly relates to a new and improved construction of an apparatus for exchanging and charging of energy storage device of transport vehicles and which contains an exchange position for the transport vehicle, a displacement device for the energy storage devices and a charging station having a plurality of deposit positions for the energy storages.

Apparatuses for the exchange of energy storage devices are known to the art in different constructional embodiments, for instance, from German Patent No. 2,410,102, published Sept. 4, 1975 for the exchange of accumulator batteries. With this prior art apparatus the battery-propelled transport vehicle is located along an associated or individual travel track or path in an exchange position. Adjacent the travel track there are arranged in a semi-circle a plurality of battery deposit and charging positions. At the center of these battery deposit and charging positions there is located an exchange carriage which can be aligned both with the transport vehicle and also with the charging positions and can be rotated by a rotary disk or turntable about an axis. A transport device is located upon the exchange carriage and serves to remove batteries out of the transport vehicle and after pivoting and aligning the exchange carriage with a predetermined charging station transfers these batteries to the charging station. The described apparatus requires a relatively large amount of space and during the exchange operation of the batteries from the transport vehicle into the charging station there are required a number of aligning, positioning and transport operations. Additionally, at each side of the travel track and the transport vehicle there is required an appropriate battery exchange and charging device, since the re-charged or re-loaded battery is inserted from one side into the transport vehicle, and thus, the discharged battery is ejected at the other side of the transport vehicle and placed upon the exchange carriage. This arrangement is comparatively expensive and owing to the different drives and movement operations it is relatively prone to disturbance. The large space requirement also necessitates considerable investment costs.

In the German Published Patent No. 2,444,711, published Apr. 1, 1976 there is described a battery exchange apparatus in which the battery boxes for the charging of the batteries are arranged in rows extending parallel to the travel track. Between the battery boxes and the travel track or, as the case may be, the transport vehicle there is located a travelling battery exchange apparatus by means of which the batteries can be removed from the transport vehicle and introduced into the battery boxes Notwithstanding the one-sided servicing of the transport vehicle which is possible with this construction, a relatively large number of manipulations are required and the battery exchange apparatus must be aligned and accurately positioned both with respect to the transport vehicle and also the battery boxes. Since the battery exchange apparatus must travel to a number of stations the susceptibility to disturbances is increased.

SUMMARY OF THE INVENTION

Therefore, with the foregoing in mind, it is a primary object of the present invention to provide a new and improved construction of an apparatus for exchanging and charging of energy storage devices of transport vehicles which does not suffer from the aforementioned drawbacks and shortcomings of the prior art constructions.

Another and more specific object of the present invention is to devise an apparatus for exchanging and charging of energy storage devices of transport vehicles which has modest space requirements, reduces the positioning operations during the battery exchange to a minimum, affords a completely automated exchange and charging operation for the energy storage, devices by means of which there can be attained short exchange times for the exchange of each one of the energy storage devices.

Now in order to implement these and still further objects of the invention, which will become more readily apparent as the description proceeds, the apparatus for exchanging and charging of energy storage devices of transport vehicles is manifested, among other things, a circular magazine which is arranged in the charging station and is pivotable about a central axis. The circular magazine includes the deposit positions for the energy storage devices. The periphery or circumference of the charging station and specifically the circular magazine are arranged adjacently in coacting relationship i.e. they merge directly or with the presence of an intermediate space, at an outer surface of the transport vehicle, and the displacement or device for the energy storage devices arranged at the region between the central axis of the circular magazine and the periphery of the charging station.

The charging station includes a circular magazine which is pivotable about a central axis. Above or beneath the circular magazine, which forms a first disk-shaped partial region of the charging station, there is arranged a second partial region, and specifically a device carrier or support. The latter carries the charging and control devices. In the circular magazine there are a plurality of deposit positions or places for energy storage devices where discharged energy storage devices of transport vehicles are again recharged. A transport carriage with gripper devices serves to displace the energy storage devices from the transport vehicle into the circular magazine and is arranged at the region between the central axis and the periphery of the circular magazine. The exchange and charging apparatus is very compact and space-saving in construction and affords the direct and automatic transfer of energy storage devices between transport vehicles and the charging station.

With the apparatus of the present invention is not required, and the movement and positioning operations are thus essentially reduced. The circular magazine arranged in the charging station contains at least one empty deposit position and a number of deposit positions with charged batteries as well as batteries which are in the process of being re-charged. The transfer of discharged energy storage devices into the charging station is accomplished directly from the transport vehicle into the empty deposit position. Conversely, following pivoting of the circular magazine or, as the case may be, the charging station through a predeterminate angular range a charged energy storage device can be directly transferred from the charging station into the transport vehicle. Since the charging station is exactly positioned it is only necessary to bring the transport vehicle into the proper exchange position, and then the exchange of an energy storage device can be accomplished without the need to resort to auxiliary vehicles.

By virtue of the arrangement of the individual devices required in the charging station in the disk-shaped partial regions there is attained a very compact structural unit. The disk-shaped partial regions are arranged above and below one another, so that the diameter of the apparatus or installation is reduced. This arrangement ensures better accessibility of the individual devices and a simpler exchange of defective partial devices or components in the charging station. All of the disk-shaped partial regions are conjointly pivotable or a partial region is stationary independent of the requirements and the constructional basic design. Since the displacement device for the energy storage device is arranged in the region between the central axis and the periphery of the charging station, the displacement device also does not require any additional surface area or space and is integrated into the compact charging station. The compact design of the energy storage device equipped with an automatic coupling and locking device affords a further simplification and automation of the exchange operation, and the positioning of the energy storage device both in the transport vehicle and in the charging station is accomplished with utmost reliability.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the different embodiments of apparatus for exchanging and charging of energy storage devices of transport vehicles has been illustrated therein as is needed to enable one skilled in the art to readily understand the underlying principles and concepts of this invention.

Figure 1:
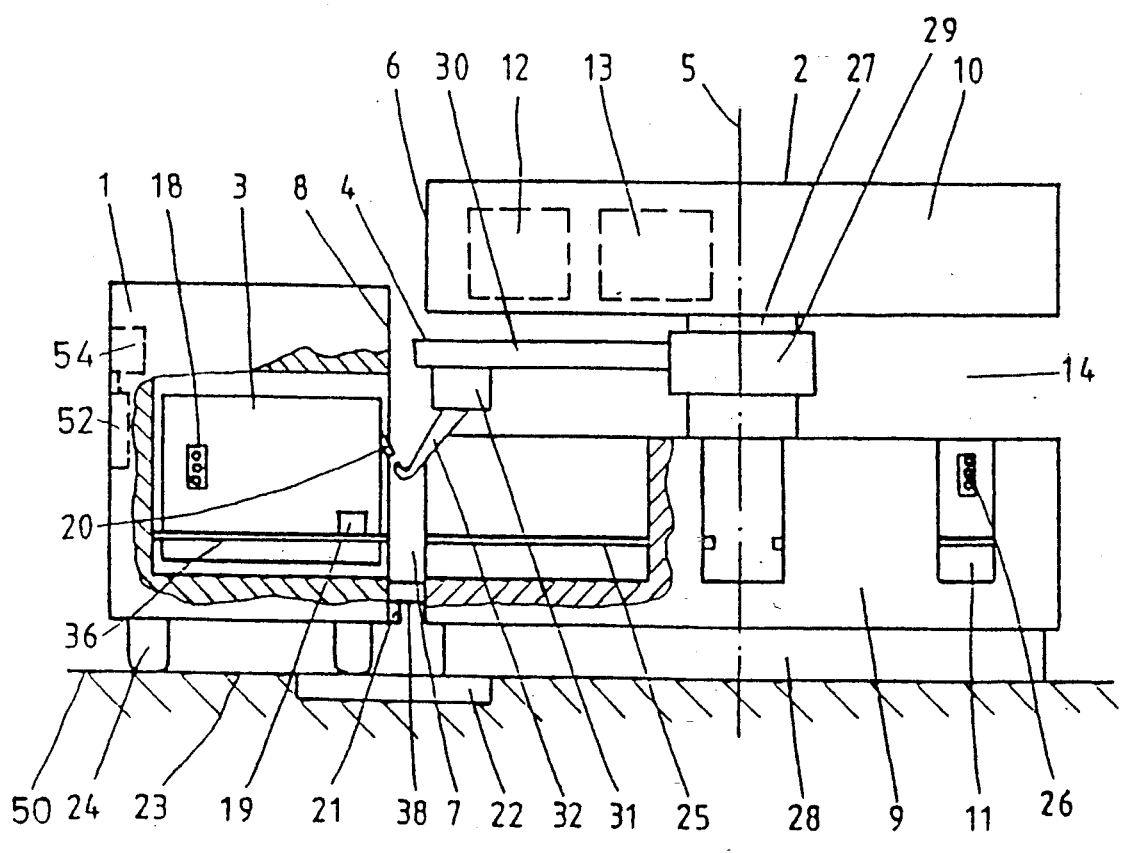
FIG. 1 is a side view of a first exemplary embodiment of inventive apparatus for exchanging and charging of energy storage devices of transport vehicles and depicting one of the transport vehicles and a charging station, the illustration being partially in sectional view.

Turning attention now to FIG. 1 there is depicted therein a transport vehicle 1 which moves along an associated travel track or path 23, and automatically, i.e. without a driver. However, the movement of the transport vehicle could optionally controlled by a driver. The drive energy is delivered to the transport vehicle 1 from an energy storage device 3, which in the illustrated embodiment is accomplished via electrical batteries or the like, preferably substantially maintenance free electrical batteries. The energy storage 3 also can contain fuel cells or other elements by means of which there can be stored energy or can comprise a substantially maintenance-free accumulator. Adjacent the travel track 23 of the transport vehicle 1 there is arranged a charging station 2. This charging station 2 comprises a substantially cylindrical-shaped circular magazine 9 which is pivotable about a central axis 5. The outer surface 6 of the circular magazine 9 is located inadjacent coacting relationship as close as possible to the outer surface 8 of the transport vehicle 1 which is directed towards the charging station 2. Between the outer surface 6 of the charging station 2 and the therein contained circular magazine 9 and the outer surface 8 of the transport vehicle 1 there is shown an intermediate space 7 which compensates for any existing positional tolerances of the transport vehicle 1 and renders possible the understanding of manipulation operations.

The transport vehicle 1 is equipped with sensors 21 which can detect the exact exchange position of the transport vehicle 1 with respect to the charging station 2 and the transport vehicle 1 is fixed in this exchange position. Additionally, at the floor or base surface 50 there is provided a mechanical positioning device 22 which exactly positions the transport vehicle 1 during the exchange operation and retains such in the requisite position. The mechanical positioning device 22 acts in known manner directly upon the wheels 24 of the transport vehicle 1 or may employ other conventional positioning devices. Moreover, there is provided a contact arrangement 38 by means of which the transport vehicle 1 can be supplied with emergency energy or power during the exchange operation. The transport vehicle 1 also can be provided with an auxiliary storage or power supply 52 for powering a vehicle control 54.

The charging station 2 comprises two substantially disk-shaped partial regions 9 and 10 which are arranged in superimposed relationship and are pivotable. The lower partial region is constituted by the circular magazine 9 and contains a plurality of deposit positions 11 for the energy storage devices 3. Each of the deposit positions 11 is equipped with appropriate guide devices 25 for the energy storage devices 3, a coupling device 26 for the connection of the electrical supply lines with the batteries and a locking device for the retention of the energy storage devices 3 in the deposit position 11. The second substantially cylindrical-shaped partial region includes the device carrier 10 located in the charging station 2 which is arranged above the first partial region, here the circular magazine 9. The device carrier 10 contains charging devices 12 which are required for the infeed of the electrical energy to the batteries and the control of the charging operation. Additionally, in this second partial region, here the device carrier 10 of the charging station 2, there are provided supplementary devices 13, i.e., the position control for the charging station 2 or the control for the displacement device 4. Both of the cylindrical-shaped partial regions 9 and 10 of the charging station 2 are mounted at the central axis 5 and are conjointly pivotable thereabout. The connection and control lines or conductors between both of the partial regions 9 and 10 are guided through a core member 27 of the charging station 2 and defining the central axis 5 and also the infeed conductors for the electrical energy are guided through this core member 27. The entire charging station 2 is supported upon a pedestal 28.

Between both of the partial regions 9 and 10 of the charging station 2 there is present an intermediate space 14 which serves for the reception of the displacement device 4. This displacement device 4 is stationary or spatially fixed and does not rotate in conjunction with the charging station 2 about the central axis 5. The displacement device 4 is supported at the core member 27 of the charging station 2 by means of a bearing 29 and is fixed in the exchange position by additional non-illustrated means. The displacement device 4 comprises a rail member 30 at which there is mounted a transport carriage 31. This transport carriage 31 is displaceable along the rail 30 by means of a suitable drive. At the transport carriage 31 there is arranged a gripper device 32 by means of which the energy storage device 3 is released and can be shifted between the transport vehicle 1 and the charging station 2.

Figure 2:
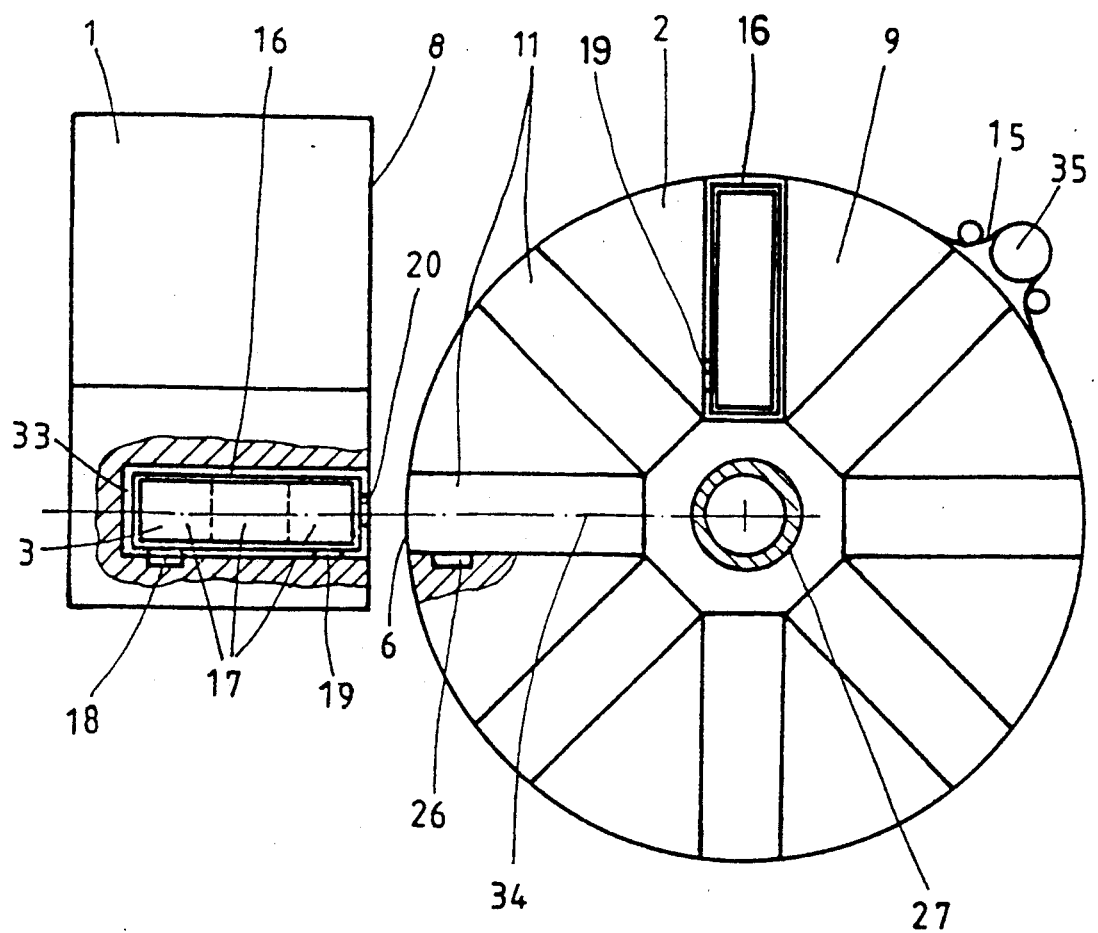
FIG. 2 is a top plan view of a portion of the inventive apparatus of FIG. 1 showing a transport vehicle and the lower partial region of a charging station.

From the illustration of FIG. 2 it will be recognized that the charging station 2 has eight deposit positions 11 for energy storage devices 3. One of these deposit positions 11 is always empty and the other seven are equipped with completely charged energy storage devices 3 containing batteries or else energy storage devices 3 containing batteries which are in the process of being recharged. The transport vehicle 1 is located in the exchange position so that the battery box 33 of the transport vehicle 1 and the empty deposit position 11 in the charging station 2 are situated along the exchange axis 34. The positioning of the empty deposit position or place 11 of the charging station 2 at the exchange axis 34 is accomplished by means of a drive 35 and a toothed belt 15. The ends of the toothed belt 15 are attached at the charging station 2, so that this charging station 2 cannot rotate or pivot through a full 360° about the central axis 5. Consequently, the electrical conductors within the core 27 are prevented from being twisted and excessively loaded or stressed. The components in both partial regions 9 and 10 of the charging station 2 are connected with one another via flexible conductors and sliding or wiper contacts, are not required. The attachment points of the ends of the toothed belt 15 are chosen such that each of the deposit positions 11 can be brought into the position of the exchange axis 34.

The energy storage devices 3 is constructed as a compact unit and includes a frame or frame member 16 in which there are arranged in the form of batteries three individual energy storage elements 17. The number of storage elements or batteries 17 arranged in the frame 16 is dependent upon the type of storage elements employed and upon the desired voltage and storage capacity. In the frame 16 there are arranged the requisite electrical conductors for the connection of the storage elements 17, which lead to a coupling location 18. This coupling location 18 comprises an automatically actuatable electrical connection by means of which the energy storage devices 3 is connected with the electrical conductors in the transport vehicle 1 and these lines lead to non-illustrated drive elements and to the control 54. The frame 16 is guided and retained in the battery box 33 by means of guides 36. At the frame 16 there is additionally provided a locking device 19 which fixes the energy storage devices 3 in the battery box 33. At the front surface of the frame 16 of the energy storage devices 3 there is located a coupling device 20 which engages the gripper device 32 of the displacement device 4. This coupling device 20 (not shown) is designed in known manner such that it actuates the locking device 19.

When the locking device 19 is released as shown in FIG. 1 the energy storage device 3 can be displaced or shifted by means of the transport carriage 31 from the guides 36 in the transport vehicle 1 upon the guide devices 25 into the empty deposit position 11 of the charging station 2. After the displacement of the energy storage device 3 from the transport vehicle 1 into the charging station 2 this energy storage device is locked in place at the deposit position 11, and the electrical connection is established by means of the coupling device 26. By means of the drive 35, the circular magazine 9 of the charging station 2 is pivoted to such an extent that a completely re-charged energy storage device 3 with the corresponding storage elements 17 in the form of electrical batteries can be brought into the position of the exchange axis 34. Using the displacement device 4 and the gripper device 32 secured at the transport carriage 31, as shown in FIG. 1 the locking device 19 of this charged energy storage device 3 is then released. The electrical connection to the coupling location 18 is accomplished by sliding or wiper contacts which can be automatically coupled-in and coupled-out by virtue of the displacement operation. As a result, the fully re-charged or re-loaded energy storage device 3 can be displaced into the transport vehicle 1 and placed in the battery box 33. By releasing the gripper device 32, the locking device 19 is actuated and at the same time the electrical connection is reestablished by means of the coupling location 18.

Since with the inventive apparatus no intermediate vehicle is required between the charging station 2 and the transport vehicle 1, the displacement operation is very simple. The energy storage devices 3 need only be moved between two positions and not aligned with an intermediate position. Furthermore, the charging station 2 can be designed to be exceedingly compact and placed as near as possible to the travel track or path 23. Consequently, the required floor area needed for the displacement operation is greatly reduced and a better utilization of the available space results. This distribution of the individual elements of the charging station 2 between a number of disk-shaped partial regions 9 and 10 affords an additional reduction of the surface area requirements and additionally ensures enhanced access to the individual elements, such as the charging devices 12 and the supplementary devices 13. Possible defective energy storage devices 3 can be removed from one of the deposit positions 11 at a random position at the outer surface 6 of the charging station 2 by means of appropriate auxiliary devices and then can be replaced by functional energy storage devices 3. This is possible inasmuch as the energy storage devices 3 can be ejected at a location other than the charging station 2. Specifically since the deposit ejection is not required to be accomplished in a position along the exchange axis 34. With appropriate construction of the displacement device 4, the ejection of the energy storage devices 3 can be accomplished in a position different from that of the exchange axis 34.

Figure 3:
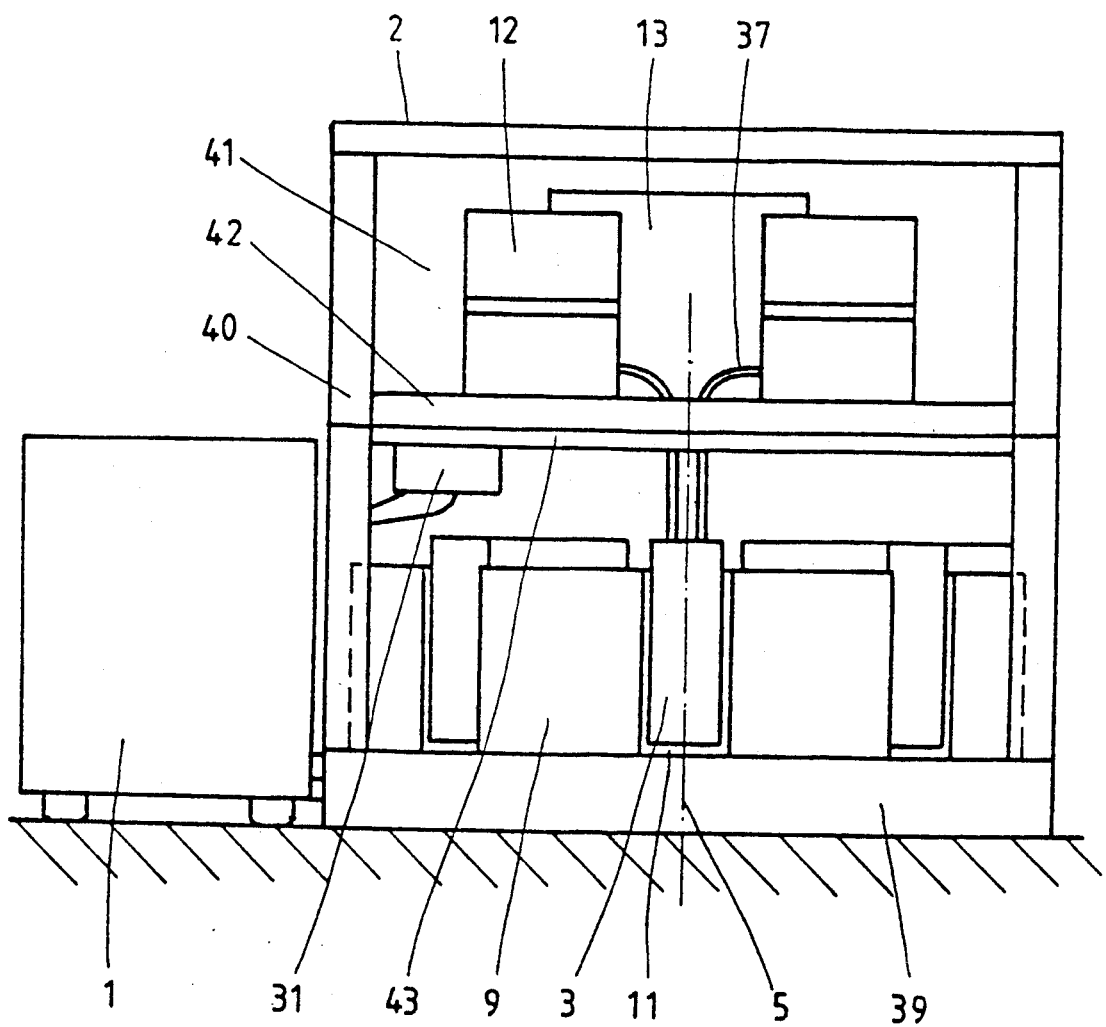
FIG. 3 is a side view of a modified construction of apparatus having a rotatable partial region and a stationary partial region and portrayed in a simplified illustration.

FIG. 3 depicts a second exemplary embodiment of the charging station 2. This charging station 2 likewise comprises a first substantially disc-shaped partial region in the form of a rotatable circular magazine 9. This circular magazine 9 is pivotable about the central axis 5 and bears upon a socket 39 or equivalent structure such as a pedestal or the like. This socket 39 is a component of a frame structure 40 which carries all of the elements of the charging station 2. This frame structure 40 also encompasses the second partial region, and specifically the device carrier 41. However, in this exemplary embodiment the device carrier is arranged to be stationary. The charging devices 12 and supplementary devices 13 are arranged upon a base plate 42. The charging devices 12 are connected by electrical conductors or lines 37 in the form of flexible cables with the deposit positions 11, in other words with the energy storage devices 3 in the circular magazine 9. Secured beneath the base plate 42 is a support member 43 at which there is displaceably arranged the transport carriage 31 or equivalent structure. The appropriate drives have not been illustrated in order to simplify the drawings. The transport vehicle 1 is located in the exchange position where a discharged energy storage devices 3 can be introduced into the charging station 2.

This exemplary embodiment also affords an extremely compact and space-saving arrangement of the charging station 2. The circular magazine 9 has a pivot range which is less than 360°, and these pivotal motions can be taken-up by the cables 37, so that no sliding or wiper contacts are necessary. The stationary partial region, in other words the support 41 is accessible at all times, so that the components 12 and 13 can be monitored and serviced. At the same time the rotatable partial region 9 of the charging station 2 is protected.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for exchanging and charging of energy storage devices of transport vehicles each having an outer surface, comprising:
   a positioning device defining an exchange position for a transport vehicle;
   a displacement device for said energy storage devices:
   a charging station having an outer surface and cooperating with said displacement device and possessing a plurality of deposit positions for said energy storage devices;
   said charging station comprising a substantially circular magazine;
   means defining a central axis about which said circular magazine pivots;
   said circular magazine containing the deposit positions for the energy storage devices;
   the circular magazine having an outer surface;
   said outer surface of said circular magazine being disposed in adjacent relationship with respect to said outer surface of said transport vehicle; and
   said displacement device for said energy storage devices being arranged between said central axis and said outer surface of said charging station.

2. The apparatus as defined in claim 1, wherein:
   said outer surface of said charging station and said outer surface of said circular magazine merge with an intermediate space at said outer surface of said transport vehicle.

3. The apparatus as defined in claim 1, wherein:
   said charging station comprises two substantially disc-shaped superimposed partial regions defining first and second partial regions;
   said first parallel region comprising said circular magazine and said deposit positions for said energy storage devices; and
   said second partial region comprising a device carrier and containing charging devices and supplementary devices.

4. The apparatus as defined in claim 3, wherein:
   said device carrier is conjointly pivotable with said circular magazine about said central axis.

5. The apparatus as defined in claim 3, wherein:
   an intermediate space is located between said partial regions of said charging station; and
   said displacement device is located in said intermediate space between said partial regions.

6. The apparatus as defined in claim 4, wherein:
   an intermediate space is located between said partial regions of said charging station; and
   said displacement device is located in said intermediate space between said partial regions.

7. The apparatus as defined in claim 1, further including:
   means for driving said circular magazine of said charging station for pivotal movement about said central axis; wherein
   said pivotal movement of said circular magazine about said central axis is less than 360°.

8. The apparatus as defined in claim 7, wherein:
   said driving means comprises a band.

9. The apparatus as defined in claim 7, wherein:
   said driving means comprises a chain.

10. The apparatus as defined in claim 3, further including:
    electrical conductor means for physically connecting each charging device with a predetermined deposit position.

11. The apparatus as defined in claim 1, wherein:
    each of said energy storage devices is structured as a compact unit;
    said compact unit comprising:
      a frame;
      a plurality of energy storage elements arranged in said frame;
      a central coupling means for coupling energy lines;
      a locking device and
      a coupling device provided for engagement with said displacement device.

12. The apparatus as defined in claim 11, wherein,
    said coupling device is connected with said locking device and said coupling device guides said displacement device.

13. The apparatus as defined in claim 1, further including:
    auxiliary storage means provided for said transport vehicle; and
    said auxiliary storage means serving to supply the control of said transport vehicle with emergency energy.

14. The apparatus as defined in claim 1, wherein:
    said transport vehicle comprises a contact arrangement for contacting and receiving electrical energy from one of said energy storage devices.

15. The apparatus as defined in claim 1, further including:
    sensor means provided for said transport vehicle for detecting an exchange position; and a mechanical positioning device arranged between said transport vehicle and said circular magazine of said charging station.

16. The apparatus as defined in claim 1, wherein: each of said energy storage devices comprises substantially maintenance-free electrical batteries.

17. The apparatus as defined in claim 1, wherein: each of said energy storage devices comprises substantially maintenance-free accumulators.

* * * * *